Patented June 23, 1936

2,044,859

UNITED STATES PATENT OFFICE 2,044,859

PROCESS OF PREPARING AIR-DRYING LACQUER FROM PHENOL-ALDEHYDE CONDENSATION PRODUCTS

Fritz Seebach, Erkner, near Berlin, Germany, assignor to Bakelite Gesellschaft mit beschrankter Haftung, Berlin, Germany No Drawing. Application January 28, 1932, Serial No. 589,537. In Germany February 4, 1931

8 Claims. (Cl. 134—26)

In a prior application Serial No. 521,509 filed March 10, 1931, now Patent 1,998,098, a process is described for the preparation of conversion products from compositions of phenol-aldehyde resins and air-drying oils, i. e. conversion products embodied in air-drying lacquers. For example, a procedure to be followed is combining a phenol-aldehyde condensation product first with an air-drying fatty oil in the presence of a solvent agent, for example cyclo-hexanol. The solvent agent is distilled off in the vacuum and the residue is then treated with an organic acid anhydride or acid chloride. The acid formed, as a result of the reaction, for example acetic acid, is distilled off in the vacuum and the residue is dissolved with a lacquer solvent.

I have now discovered in continuing the experiments with this process that the combining of a resole with an air-drying oil and the subsequent conversion of this compound with acid anhydrides or acid chlorides may be combined in one step, if for example the acetic acid anyhydride can also act as a solvent in combining the resoles with the air-drying oils. Contrary to what was expected, the anhydride in the example given according to test results, first has a combining influence on the mixture of resole and oil, for example China-wood oil, and acetylation of the compound occurs only after such combination is effected. If for example resole and wood oil are boiled with acetic acid anhydride for a short time, say 10 minutes, products are obtained which in their behaviour are similar to the compound products resulting from resole, wood oil and cyclo-hexanol as the solvent. For example, they are hardenable to a clear film by heating, though they are deficient in lye-resistance, for instance, in resistance to 5-10% aqueous soda lye. By continuing boiling for some time, for example one hour, they become resistant to lye.

*Example 1*

Parts by weight

Resole made from cresol, formaldeyhyde and
  ammonia as a catalyst------------------ 200
China-wood oil------------------------- 120
Acetic acid anhydride------------------ 200 are kept boiling for one hour. Then the acetic acid is distilled off, suitably in vacuo. Toward the end of distillation some solvent naphtha is added to keep the substance boiling more readily. The resulting resin substance is hardenable. Furthermore it yields air-drying coating substances if prepared by the usual manufacturing methods for lacquers, for example dissolving in toluol, the resistance to lye being a special characteristic of these coatings. The resin can be worked up alone or admixed with other synthetic resins or even with natural resins.

Instead of the acetic acid anhydride one may also use acetic acid. If acetic acid is employed, larger quantities in proportion are required than of the anyhydride, and boiling is necessary for a longer time.

*Example 2*

Parts by weight

Resole made from phenol, formaldehyde and
  ammonia as a catalyst------------------ 120
China-wood oil------------------------- 80
Glacial acetic acid-------------------- 400 are kept boiling for 4-6 hours. The non-reacted acetic acid is distilled off in vacuo. Toward the end of distillation some solvent naphtha is added to facilitate boiling. Coatings made from a solution of such a resin in one of the common lacquer solvents, for example toluol, dry very rapidly (in one to two hours). After a few days they become hard like stone. Then they are perfectly insensitive to lye. The coating may also be hardened by heating, which action occurs very rapidly at temperatures below 100° C.

The conversion can be accelerated by the use of catalysts, for instance acids, such as sulfuric or sulfo-acids, which accelerate the acetylating process. As a rule such acids must be removed, and consequently where this is necessary, acids are added which are readily removed; for instance, sulfurous acid or gaseous hydrochloric acid can be driven off by a current of carbon dioxide. In place of acids it is possible to use anyhdrous sodium acetate and similar salts as accelerators.

As starting substances phenol-aldehyde condensation products in general can be used, including the products obtained from phenol, cresol and the higher phenols reacted with formaldehyde, acetaldehyde, benzaldehyde, furfural and other methylene-containing agents. As acid anhydrides or chlorides, the anhydrides or chlorides of aliphatic or aromatic acids may be used, for example, acetic anhydride, the mixed anhydride of formic and acetic acids, benzoyl chloride, chlorides of fatty acids as palmitic, stearic, adipic, etc. It is also possible to use a mixture of several acid anhydrides or acid chlorides. These compounds are preferably used in proportions indicated as necessary for complete reaction with the hydroxyl groups of the phenol-aldehyde condensation products. Unchanged ingredients and by-products formed are removed by distillation or other suitable procedure when necessary.

The final products may be incorporated with solvents for making varnishes either with or without the addition of driers. Other natural or synthetic resins may be included with them so long as they do not affect the air-drying or other desired property to an objectionable degree. Fillers, dyes, plasticizing agents, etc. can be admixed and the resulting compositions used for the production of laminated or molded objects or to impregnate porous materials, etc.

The varnishes made in accordance herewith can serve as coatings on wood, stone, metal, ships' bottoms, etc. as impregnating media for sail cloth, paper and other porous materials, laminated or non-laminated, for lacquering of apparatus or parts of apparatus attached by alkalies, etc.

I claim:

1. Process of preparing compositions suitable for coatings drying in air from a heat-hardenable phenol-aldehyde resin and an air-drying fatty oil which comprises boiling a mixture of the resin with a lesser proportion by weight of the oil together with a proportion by weight at least equal to that of the resin of a member of the group consisting of carboxylic acids, their anhydrides and chlorides, said member acting as a solvent in promoting a homogenization of the resin with the oil, and distilling the acid from the product thus formed.

2. Process of preparing compositions suitable for coatings drying in air from heat-hardenable phenol-aldehyde resin and an air-drying fatty oil which comprises heating the resin with the fatty oil in the presence of a member of the group consisting of carboxylic acids, their anhydrides and chlorides, said member acting as a solvent in promoting a homogenization of the resin and the oil, and distilling acid therefrom.

3. Process according to claim 2 in which the member is added in proportion to react with the hydroxyl of the resin.

4. Process according to claim 2 in which the member is acetic acid anhydride.

5. Process according to claim 2 in which the member is acetic acid.

6. As a new composition of matter a product identical with that obtainable by the process of claim 2.

7. As a new composition of matter suitable for coatings drying in air the reaction product of a heat-hardenable phenol-aldehyde resin with an air drying fatty oil in the presence of acetic acid.

8. As a new composition of matter suitable for coatings drying in air the reaction product of a heat-hardenable phenol-aldehyde resin with an air drying fatty oil in the presence of acetic acid anhydride.

FRITZ SEEBACH.